US009774898B2

(12) United States Patent
Murphy et al.

(10) Patent No.: US 9,774,898 B2
(45) Date of Patent: Sep. 26, 2017

(54) APPARATUS AND METHOD FOR CONTENT INFLUENCED VIDEO COMMENTARY

(71) Applicant: Webate, LLC, Los Angeles, CA (US)

(72) Inventors: James Murphy, Los Angeles, CA (US); Joshua Chavez, Los Angeles, CA (US); Sagar Singh, Los Angeles, CA (US)

(73) Assignee: WEBATE, LLC, Los Angeles, CA (US)

( * ) Notice: Subject to any disclaimer, the term of this patent is extended or adjusted under 35 U.S.C. 154(b) by 0 days.

(21) Appl. No.: 14/736,044

(22) Filed: Jun. 10, 2015

(65) Prior Publication Data

US 2015/0358658 A1 Dec. 10, 2015

Related U.S. Application Data

(60) Provisional application No. 62/010,286, filed on Jun. 10, 2014.

(51) Int. Cl.
| H04N 7/16 | (2011.01) |
| H04N 21/258 | (2011.01) |
| H04N 21/81 | (2011.01) |
| H04N 21/854 | (2011.01) |
| H04N 21/4788 | (2011.01) |

(52) U.S. Cl.
CPC ... *H04N 21/25883* (2013.01); *H04N 21/4788* (2013.01); *H04N 21/812* (2013.01); *H04N 21/854* (2013.01)

(58) Field of Classification Search
CPC .......... H04N 21/23424; H04N 21/252; H04N 21/2743; H04N 21/4788; H04N 21/488
See application file for complete search history.

(56) References Cited

U.S. PATENT DOCUMENTS

| 8,464,302 | B1* | 6/2013 | Liwerant | H04N 21/2181 725/105 |
| 2002/0104083 | A1* | 8/2002 | Hendricks | H04H 20/10 725/34 |
| 2004/0221323 | A1* | 11/2004 | Watt | H04N 7/15 725/135 |
| 2005/0021803 | A1* | 1/2005 | Wren | H04L 29/06027 709/231 |
| 2005/0262542 | A1* | 11/2005 | DeWeese | H04L 12/1818 725/106 |
| 2006/0029093 | A1* | 2/2006 | Van Rossum | G06F 17/30017 370/432 |
| 2009/0164484 | A1* | 6/2009 | Horowitz | H04N 7/17318 |
| 2011/0119694 | A1* | 5/2011 | Roberts | H04H 60/33 725/9 |

(Continued)

*Primary Examiner* — Pankaj Kumar
*Assistant Examiner* — Timothy Newlin
(74) *Attorney, Agent, or Firm* — Schultz & Associates, P.C.

(57) ABSTRACT

A system and method for distributing video commentary related to certain content by a user to another user or user group is disclosed. The system includes a network, a system server connected to the network, and a set of user machines connected to the network. A third party content provider is connected to the system server. The system server provides a distribution system and process that defines user groups among the set of user machines in order distribute content between individual user machines and among user groups.

12 Claims, 11 Drawing Sheets

(56) References Cited

U.S. PATENT DOCUMENTS

| | | | |
|---|---|---|---|
| 2011/0202537 A1* | 8/2011 | Shamma | G06F 17/3082 |
| | | | 707/741 |
| 2012/0321271 A1* | 12/2012 | Baldwin | H04N 9/8715 |
| | | | 386/201 |
| 2012/0321281 A1* | 12/2012 | Hilem | H04N 9/8233 |
| | | | 386/241 |
| 2012/0331496 A1* | 12/2012 | Copertino | H04N 21/25866 |
| | | | 725/14 |
| 2013/0262564 A1* | 10/2013 | Wall | H04N 21/2743 |
| | | | 709/203 |
| 2014/0013200 A1* | 1/2014 | White | H04N 21/235 |
| | | | 715/230 |
| 2014/0068437 A1* | 3/2014 | Dedapper | G06Q 50/01 |
| | | | 715/719 |

* cited by examiner

APPARATUS AND METHOD FOR CONTENT INFLUENCED VIDEO COMMENTARY

CROSS REFERENCE TO RELATED APPLICATION

This application claims priority benefit from U.S. Provisional Application No. 62/010,286, filed Jun. 10, 2014. The patent application identified above is incorporated herein by reference in its entirety to provide continuity of disclosure.

FIELD OF THE INVENTION

The present invention relates to systems and methods for distributing content. In particular, the present invention relates a system and method for distributing content influenced video commentary.

BACKGROUND OF THE INVENTION

Current content and communication platforms are generally slow, fail to focus on the interests of the individual users, and do not enable collaborative engagement between users. For example, written text in the form of text messages and e-mail is a slow form of communication. At best, a professional typist typically can only type up to 50 to 80 words per minute. Further, text messages and e-mails are frequently misinterpreted by the recipient, thereby causing conflict between users. More recently, text messages and e-mails are employed to harass or "bully" unsuspecting recipients. With the proliferation of social media networks this problem has been exacerbated by recipients frequently receiving unwanted and sometimes unpleasant messages.

Similarly, social media networks fail to focus on an individual user interests and alienate users. For example, sifting through news feeds for topics relevant and interesting to a user is time consuming. Social media network feeds are filled with streams of content that is not focused to each individual user that views the feed. More frequently, users blindly post unfocused and irrelevant messages causing lack of engagement amongst users.

The prior art has attempted to solve these problems with limited success. For example, U.S. Pat. No. 7,716,376 to Price, et al. discloses a method for enabling users to exchange content which allows several users to collectively group together to view the same streaming video. The video is synchronized on the client devices and provides an environment in which users may exchange commentary. The users may send text, graphics, or other media to one another over a network during the video. However, the exchanged media is superimposed over the streamed video resulting in an overlap of content and miscommunication of messages between users.

U.S. Publication No. 2012/0321271 to Baldwin, et al. discloses a method of providing commentary for media content to media presentation devices wherein the commentary data received comprises a stream of audio and/or video data, one or more of text, markup content, and one or more software triggers. The method also comprises receiving a user input from the commentator requesting to view other commentary generated by a member of a social network of the requesting viewer, and sending a request to the commentary server for such commentary. However, like Price, the method in Baldwin overlays the commentary onto the main media content resulting in miscommunication of messages between users.

Therefore, there is a need in the art for a content distribution platform for faster communication that focuses on individual user interests for accelerated user engagement. What is needed in the art is a video messaging platform that eliminates miscommunicated emotions through written text and a direct distribution platform that enables users to receive relevant content tailored to the interests of each user, thereby holding the attention of each user and enabling collaboration between users.

SUMMARY

A system and method for distributing video commentary related to certain content by a user to another user or user group is disclosed. The system includes a network, a system server connected to the network, and a set of user machines connected to the network. A third party content provider is connected to the system server. The system server provides a distribution system and process that defines user groups among the set of user machines in order distribute content between individual user machines and among user groups.

BRIEF DESCRIPTION OF THE DRAWINGS

In the detailed description described below, reference is made to the accompanying drawings.

DETAILED DESCRIPTION

It will be appreciated by those skilled in the art that aspects of the present disclosure may be illustrated and described in any of a number of patentable classes or contexts including any new and useful process or machine or any new and useful improvement. Aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Figure 1:
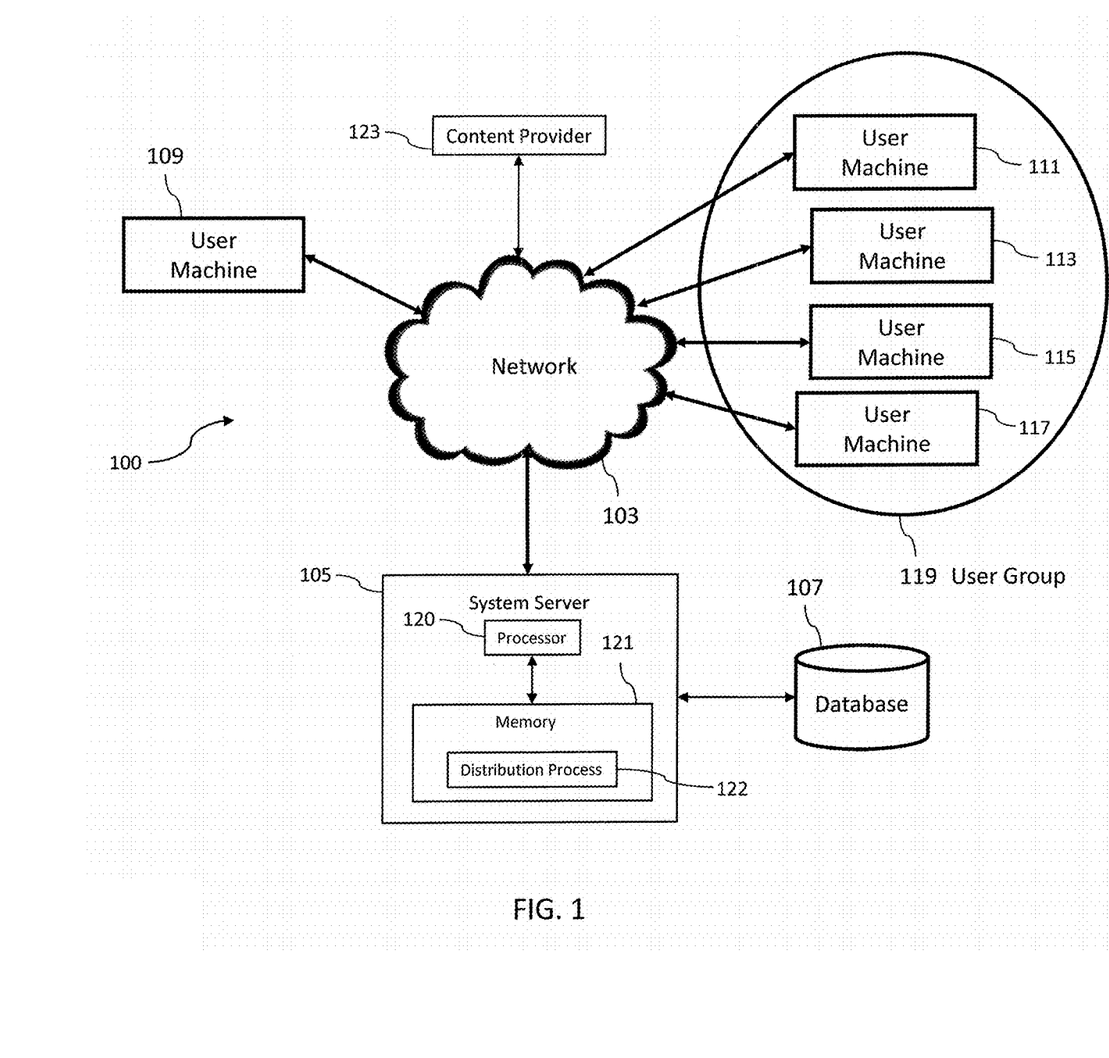
FIG. 1 is a schematic of a system for distributing video commentary of a preferred embodiment.

Referring to FIG. 1, system 100 includes system server 105 connected to database 107. System server 105 is connected through network 103, to user machine 109. User machine 109 is connected through network 103 to system server 105. Each of user machines 111, 113, 115 and 117 is connected to system server 105 through network 103. User machines 111, 113, 115 and 117 comprise user group 119. Content provider 123 is connected to system server 105 through network 103. System server 105 includes processor 120 and memory 121 connected to processor 120. Distribution process 122 is stored in memory 121 and executed by processor 120. The relationship between user machines which form user group 119 is stored by system server 105 in database 107.

In a preferred embodiment, network 103 is a wide area network such as the Internet, but can encompass other wide area networks and intranet systems.

In a preferred embodiment, system server 105 has the following specifications:

```
OS Name   Microsoft Windows Server 2008 R2 Standard
Version   6.1.7601 Service Pack 1 Build 7601
OS Manufacturer   Microsoft Corporation
System Manufacturer   Supermicro
System Model   X8DTN
System Type   x64-based PC
Processor   Intel(R) Xeon(R) CPU   E5620 @ 2.40 GHz, 2401 Mhz, 4 Core(s), 8 Logical Processor(s)
Processor   Intel(R) Xeon(R) CPU   E5620 @ 2.40 GHz, 2401 Mhz, 4 Core(s), 8 Logical Processor(s)
BIOS Version/Date   American Megatrends Inc. 2.1c, Oct. 28, 2011
SMBIOS Version   2.6
Hardware Abstraction Layer   Version = "6.1.7601.17514"
Installed Physical Memory (RAM)   24.0 GB
Total Physical Memory   24.0 GB
Description   Disk drive
Manufacturer   (Standard disk drives)
Model   Adaptec Array SCSI Disk Device
Bytes/Sector   512
Media Loaded   Yes
Media Type   Fixed hard disk
Partitions   1
SCSI Bus   4
SCSI Logical Unit   0
SCSI Port   6
SCSI Target ID   0
Sectors/Track   63
Size   837.00 GB (898,718,768,640 bytes)
Total Cylinders   109,263
Total Sectors   1,755,310,095
Total Tracks   27,862,065
Tracks/Cylinder   255
Partition   Disk #0, Partition #0
Partition Size   837.00 GB (898,719,809,536 bytes)
Partition Starting Offset   1,048,576 bytes
```

Other suitable servers and server specifications may be employed.

In a preferred embodiment, each of user machines 109, 111, 113, 115, and 117 is a smartphone running an operating system such as iOS by Apple Inc. or Android by Google, Inc. Other operating systems may be employed. For example, each of user machines 109, 111, 113, 115, and 117 is a Galaxy S4 smartphone by Samsung Electronics having the following specifications:

```
Description   Samsung Galaxy S4
Manufacturer   Samsung
Model   SPH-L720
Carrier   Sprint
Hardware Version   L720.08
Android Version   4.4.2
Baseband Version   L720VPUFNG2
Kernel Version   3.4.0-2162929
Build Number   KOT48H.L720VPUFNG2
Memory   16 GB
```

In another embodiment, each of user machines 109, 111, 113, 115, and 117 is a tablet computer. In another embodiment, each of user machines 109, 111, 113, 115, and 117 is a personal computer, such as a laptop or desktop computer. Any computing device known in the art may be employed.

In a preferred embodiment, content provider 123 is any third party news outlet, video content provider, and/or media content provider. Any type of content provider may be employed.

In a preferred embodiment, users such as individuals or businesses, such as manufacturers or advertisers, utilize user machines 111, 113, 115 and 117 to communicate with system server 105.

In a preferred embodiment, user machines 109, 111, 113, 115, and 117 communicate with distribution process 122 through a native mobile application. In another embodiment, user machines 109, 111, 113, 115, and 117 communicate with distribution process 122 through a web application via a web browser.

In a preferred embodiment, system server 105 provides a private video messaging loop in which video content can only be accessed by invitation by its original poster, as will be further described below. In this embodiment, all parties involved in the messaging loop will be able to see video comments posted by other members as they are being sent.

In a preferred embodiment, system server 105 provides multi-threaded video commentary. In this embodiment, user machines have access to video comment in a multi-threaded format. After an original post is created, user machines can comment on not only original content but other video commentary creating new timelines within the original video conversation.

In a preferred embodiment, system server 105 provides business meeting video commentary. In this embodiment, businesses are provided access to record meetings and other group activities in a video format and distribute the video to employees specifying certain segment authorizations through written notes and text as to instructions for viewing and comment.

In a preferred embodiment, "channels" are provided by system server 105 as conduits for branded video. "Branded video" is provided to certain manufacturer or advertiser users which are allowed unlimited time to upload commercials and other advertising content and to receive direct feedback and video content from user machines and user groups.

Figure 2A:
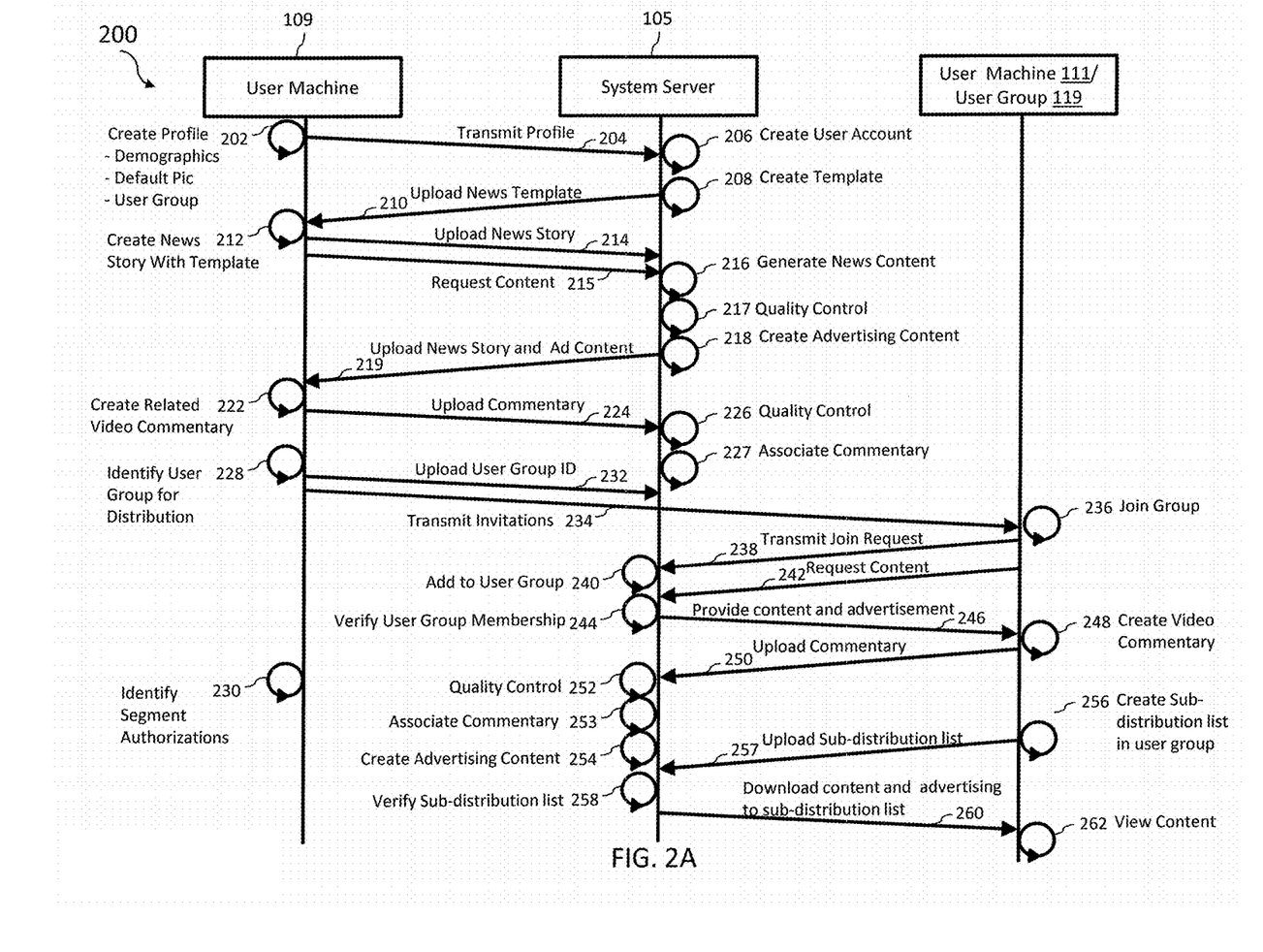
FIG. 2A is a flowchart of a method for distributing video commentary of a preferred embodiment.

Referring to FIG. 2A, distribution process 122 will be further described as method 200 distributing content. At step 202, a user associated with user machine 109 creates a profile including demographic information related to the user and certain identifying information such as default pictures. The profile further includes a set of preferences that includes a set of content interests. For example, the set of content interests includes sports, politics, science and technology, and entertainment. The profile optionally contains an identification of other user machines 111 comprising a user group 119. In a preferred embodiment, a default picture is used to represent the user to other users on system server 105. In a preferred embodiment, the default picture is a three (3) second silent profile video which is activated once upon a first view and will only start again if prompted.

At step 204, the profile is transmitted to system server 105. At step 206, system server 105 then creates the user account including the user information. At step 208, system server 105 creates a news template. In a preferred embodiment, the news template provides an article template in which articles are created and submitted in different categories by user machines and user groups. At step 210, system server 105 uploads the news template to user machine 109. At step 212, user machine 109 optionally elects to use the news template to create a news article. In this embodiment, the news article includes any type of media including text, images, audio, and/or video. At step 214, the news article is uploaded to system server 105. At step 215, user machine 109 requests content from the system server.

At step 216, system server 105 generates the news content from a third party content provider according to the set of preferences and/or uses news articles uploaded in step 214. At step 217, system server 105 conducts a quality control survey of the news article provided by user machine 109. In this step, the news article is scanned for harmful content such as viruses and malware, typographical errors, audio quality, and/or video quality. In one embodiment, the news article is scanned for objectionable material such as adult content and/or profanity. Any type of content filtering may be employed.

At step 218, system server 105 creates advertising content relevant to the news story, as will be further described below. At step 219, the news story and the advertising content are uploaded to user machine 109. At step 222, user machine 109 creates video commentary related to the news story. At step 224, user machine 109 uploads the video commentary to system server 105. At step 226, system server 105 conducts a quality control review of the uploaded commentary, as previously described. At step 227, the uploaded commentary is associated with and transformed into one or more threads of other videos, articles, and/or other video commentary. Each uploaded comment includes a code or "hashtag" to identify each comment that is generated through a hash of a user code, a date/time code, and a file length code. The code is stored in the database, along with the commentary, as link to the original article, video, or commentary.

At step 228, user machine 109 identifies a user group for distribution by user group id. In this step, the user selects a list of individual user and/or user groups to which the content will be distributed.

At step 230, user machine 109 optionally identifies segment authorizations for each user machine of the set of group members. In a preferred embodiment, segment authorizations are contained in a file which identifies which user machines are authorized to view which segments of the news story and the video content. At step 232, the user group id and the segment authorizations are transmitted to system server 105 where they are stored for later use. At step 234, user machine 109 transmits invitations to user machine 111 and/or user group 119 to join a user group. In a preferred embodiment, these requests are known as "video friend requests." The video friend request can be sent through text message, email, app video requests and other social media platforms.

At step 236, user machine 111 and others members of user group 119 are queried as to joining the group. At step 238, user machine 111 and/or user group 119 transmits a join request. At step 240, system server 105 adds each user machine of the user group to the group id. At step 242, user machine 111 and/or user group 119 transmits a request for content. At step 244, system server 105 verifies the group membership for each content request for each user machine. At step 246, system server 105 provides content and advertising to user machine 111 and user group 119. At step 248, user machine 111 and/or user group 119 creates related video commentary. At step 250, the video commentary is uploaded to system server 105. At step 252, system server 105 conducts a quality control review of the uploaded commentary, as previously described. At step 253, the uploaded commentary is associated with and transformed into one or more threads of other videos, articles, and/or other video commentary, as previously described. At step 254, system server 105 creates related advertising content.

At step 256, user machine 111 and/or user group 119 optionally creates a sub-distribution list. In a preferred embodiment, a sub-distribution list includes a sub-set of the user machines in user group 119. At step 257, user machine 111 and/or user group 119 uploads the sub-distribution list to system server 105. At step 258, the system server verifies and records the sub-distribution list. At step 260, system server 105 downloads the content and advertising to the sub-distribution list. At step 262, user machine 111 and/or user group 119 views the content and the commentary.

Figure 2B:
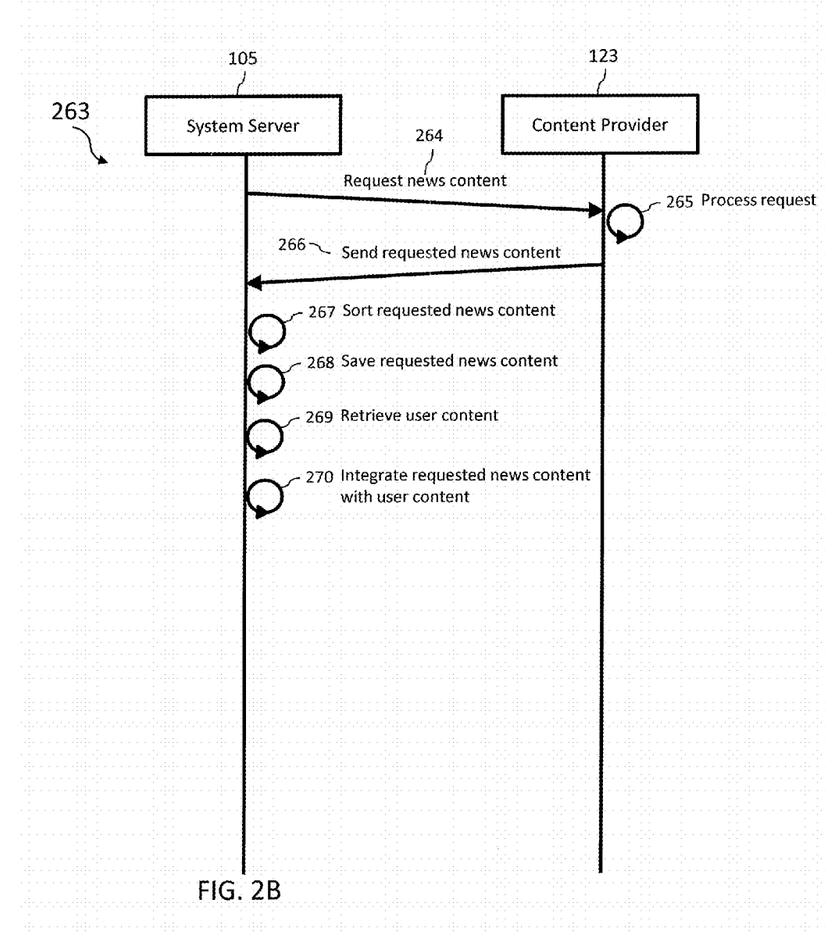
FIG. 2B is a flowchart of a method for generating content of a preferred embodiment.

Referring to FIG. 2B, step 216 will be further described as method 263 for generating content. At step 264, system server 105 requests a set of news content from content provider 123 according to the set of preferences. At step 265, content provider 123 processes the request and retrieves the requested set of news content. At step 266, the requested set of news content is sent to system server 105. At step 267, the set of news content is sorted according category by scanning metadata included with each piece of news content and generating a hashtag for each piece of news content. At step 268, the sorted set of news content including the set of hashtags and corresponding metadata is saved into the database. At step 269, a set of user content is retrieved from the database. At step 270, the set sorted news content is integrated with the set of user content into a single set of content. In a preferred embodiment, system server 105 generates a combined hashtag to associate the sorted news content with the retrieved user content. In a preferred embodiment, system server 105 scans the contents of the set of sorted news content and the set of user content and eliminates any duplicates, thereby reducing the amount of memory and bandwidth required for the single set of content and matches hashtags of the set of user content with the set of sorted news content.

Figure 3:
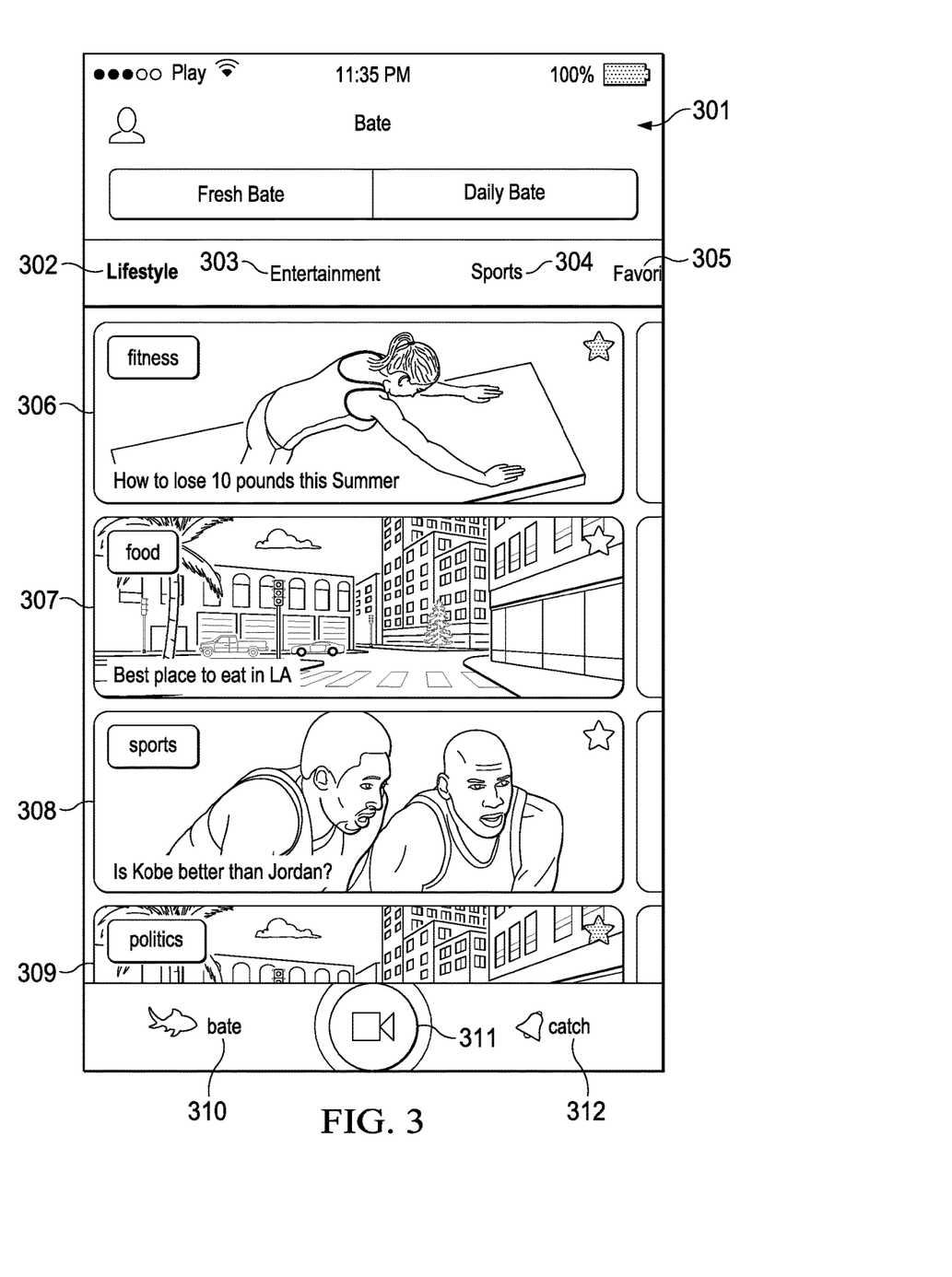
FIG. 3 is a screenshot of a news template of a preferred embodiment.

Referring to FIG. 3, news template 301 includes categories 302, 303, 304, and 305. Each category has a subcategory. For example, category 302 for "Lifestyle" includes subcategories 306, 307, 308, and 309, labeled "fitness", "food", "sports", and "politics", respectively. In a preferred embodiment, a user selects any of categories 302, 303, 304, and 305 and/or subcategories 306, 307, 308, and 309 to view content. News template 301 further includes create button 310, record button 311, notification button 312. Create button 310 provides an article template, as will be further described below. Record button 311 enables a camera application on the device to record a video and/or a video comment. Notification button 312 refreshes content in news template 301 and organizes the new content in reverse chronological order.

Figure 4:
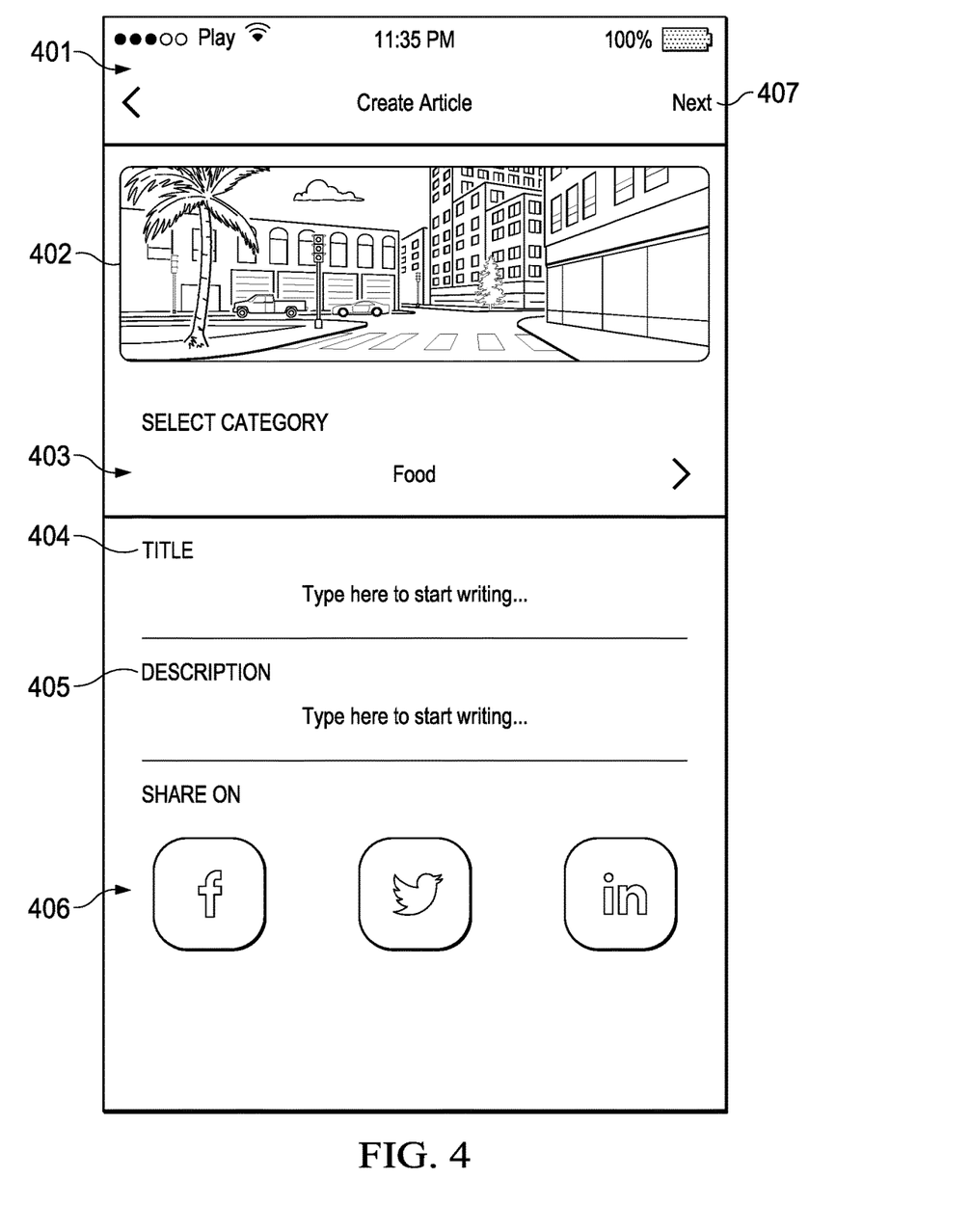
FIG. 4 is a screenshot of an article template of a preferred embodiment.

Referring to FIG. 4, article template 401 includes image/video 402 uploaded or recorded, category menu 403, title 404, description 405, and share menu 406. In one embodiment, description 405 includes a link to a website or social media account of the user. Share menu 406 allows the article to be posted to various third party social networks, such as Facebook, Twitter, and/or LinkedIn. Next button 407 enables a user group to be selected for distribution of the news article.

Figure 5:
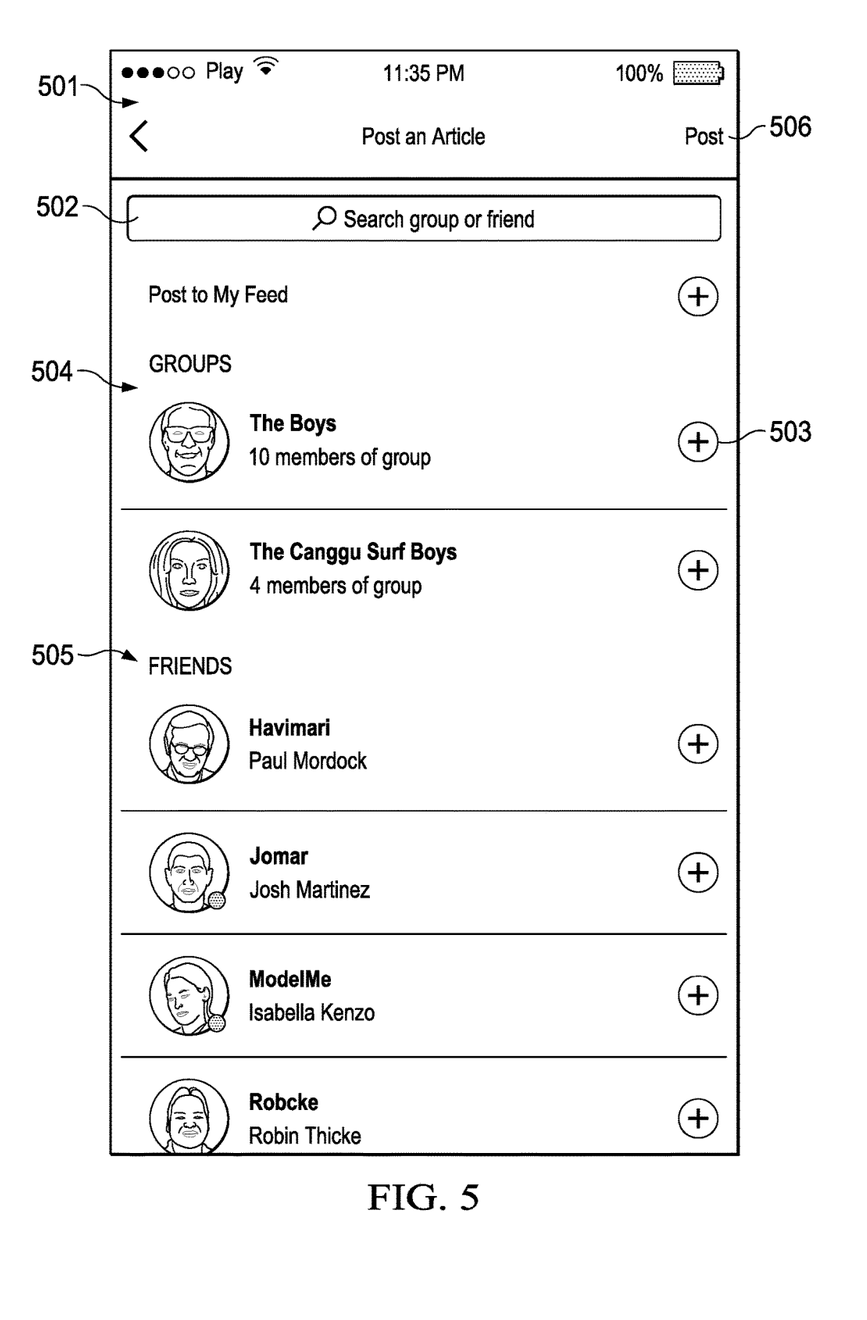
FIG. 5 is a screenshot of a distribution selection menu of a preferred embodiment.

Referring to FIG. 5, distribution menu 501 includes search tool 502, a set of user groups 504, and a set of users 505. Any user group 504 and/or any user 505 are selected using a corresponding select button 503. Post button 506 is selected to distribute the article to the selected set of user groups 504 and/or the selected set of users 505.

Figure 6:
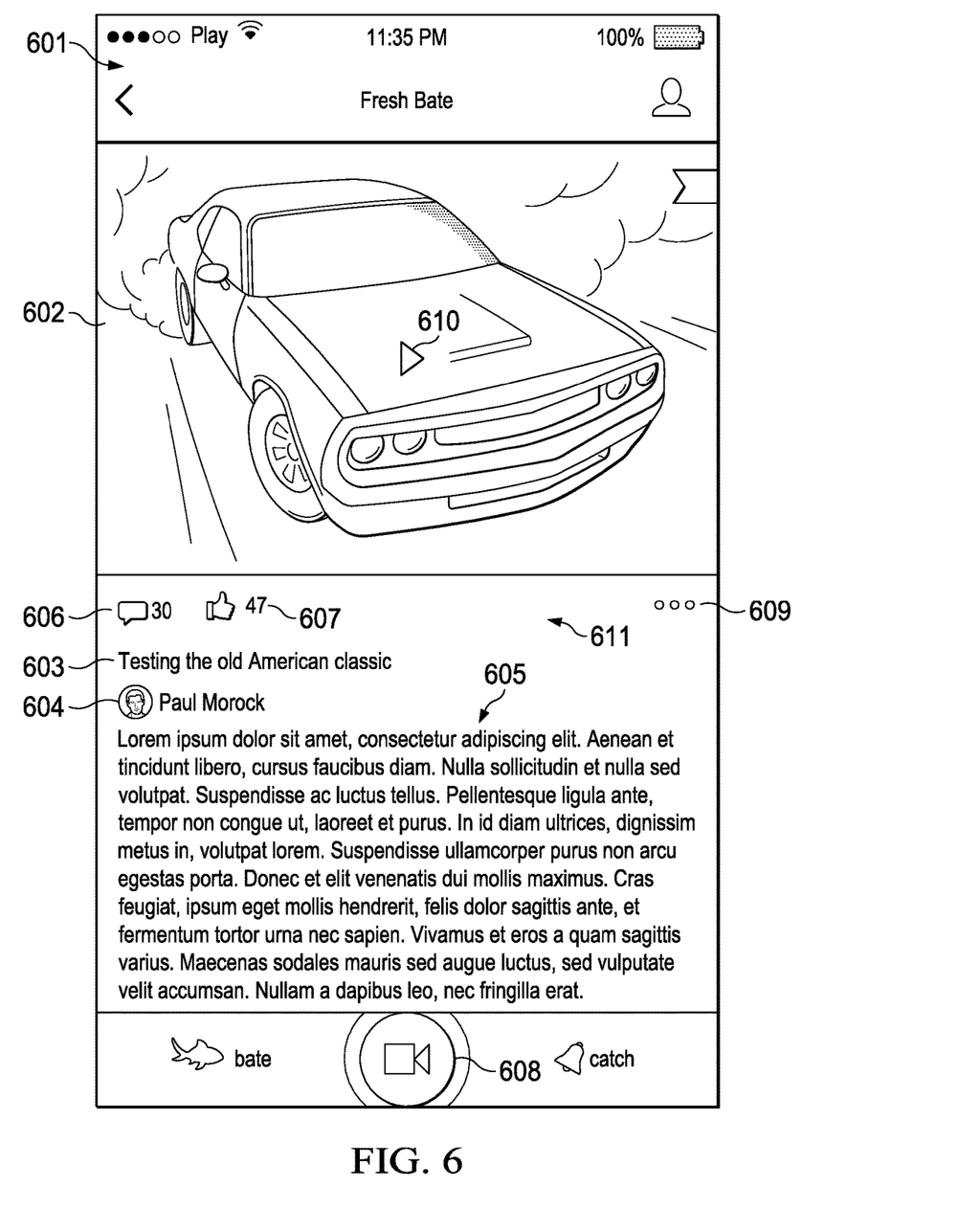
FIG. 6 is a screenshot of an article of a preferred embodiment.

Referring to FIG. 6, article 601 includes video 602, title 603, user author 604, and description 605. Comments section 611 includes comment indicator 606 and "like" indicator 607. Comment indicator 606 displays the number of comments posted to article 601. "Like" indicator 607 displays the number of "likes" posted to article 601. Video 602 includes play button 610. Record button 608 is adjacent to description 605 to record any comments. Expand tool 609 expands comments section 611.

Figure 7:
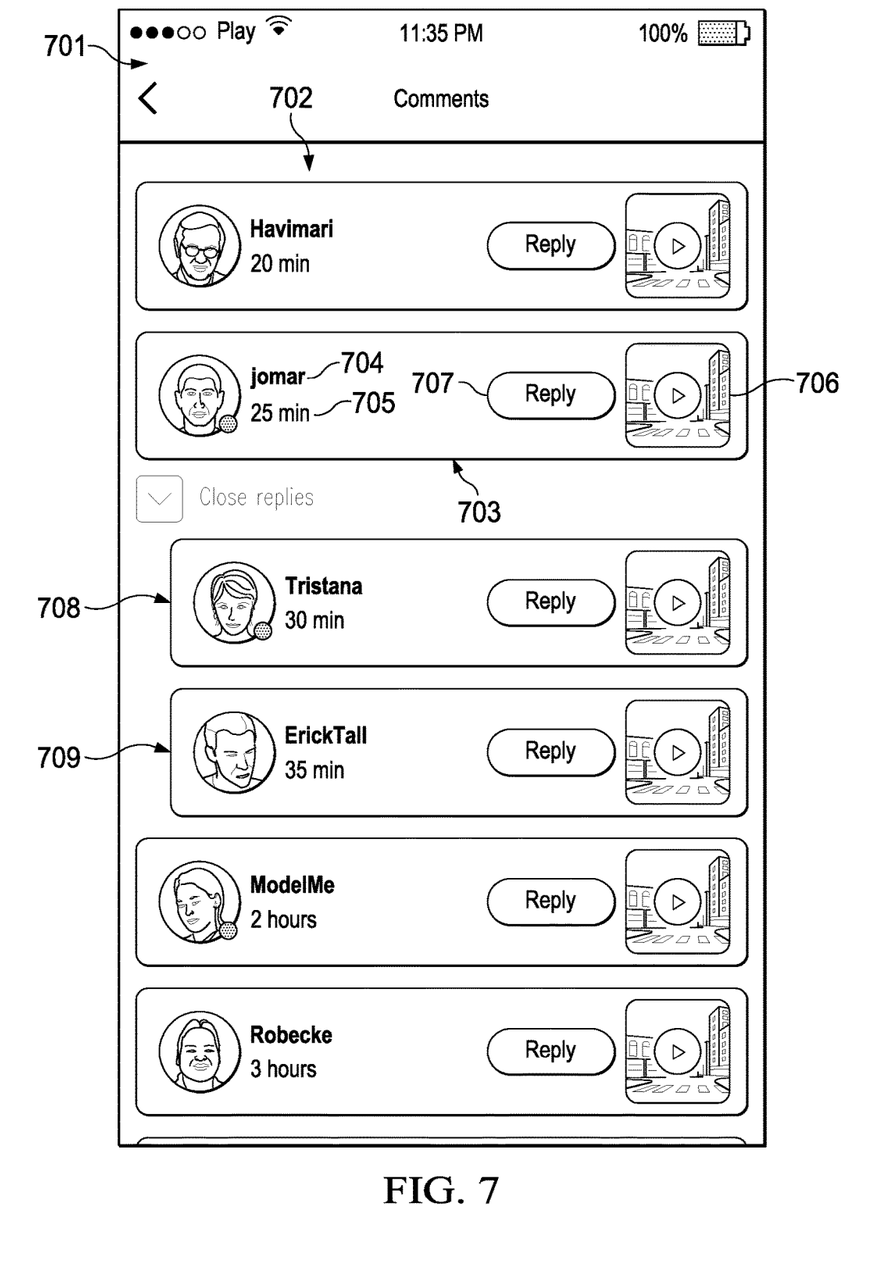
FIG. 7 is a screenshot of a comments section of an article of a preferred embodiment.

Referring to FIG. 7, comments section 701 includes a set of comments 702. Each comment 703 of set of comments 702 includes user 704, post time 705, and video comment 706. Reply button 707 enables sub-comments 708 and 709 to be posted to comment 703. Each of sub-comments 708 and 709 includes the same information as comment 703.

Figure 8:
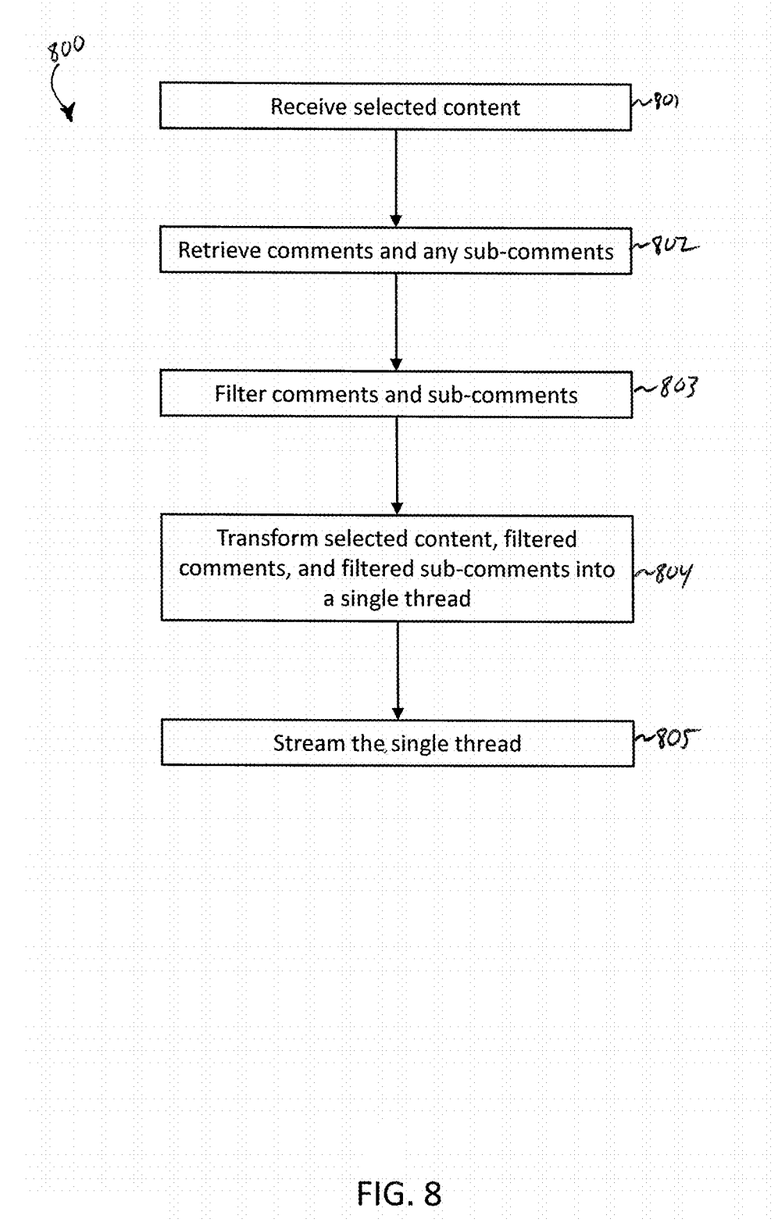
FIG. 8 is a flowchart of a method for relating a set of video comments for playback.

Referring to FIG. 8, step 262 will be further described as method 800 for streaming and viewing distributed content. At step 801, the system server receives a selection of content for viewing by a user on a user machine. At step 802, a set of comments and a set of sub-comments corresponding to the selected content are retrieved from a database by reference to the created hashtag and any associated hashtags. At step 803, the set of comments and the set of sub-comments are filtered according to a distribution list, a sub-distribution list, and segment authorizations.

At step 804, the selected content, the set of filtered comments, and the set of filtered sub-comments are transformed into a single thread by linking properly related files based on the hashtags and/or other file identifiers. In a preferred embodiment, the single thread is combined to stream, in chronological order, the selected content, all filtered comments, each filtered comment having a set of filtered sub-comments, and the set of sub-comments corresponding to the filtered comment. The thread then advances to the next filtered comment having a set of filtered comments. For example, referring to FIG. 7, the single thread is assembled to stream in chronological order the set of comments 702. Comment 703 is then streamed. Sub-comments 708 and 709 which correspond to comment 703 are then streamed. Returning to FIG. 8, at step 805, the single thread is streamed to the user machine.

Figure 9:
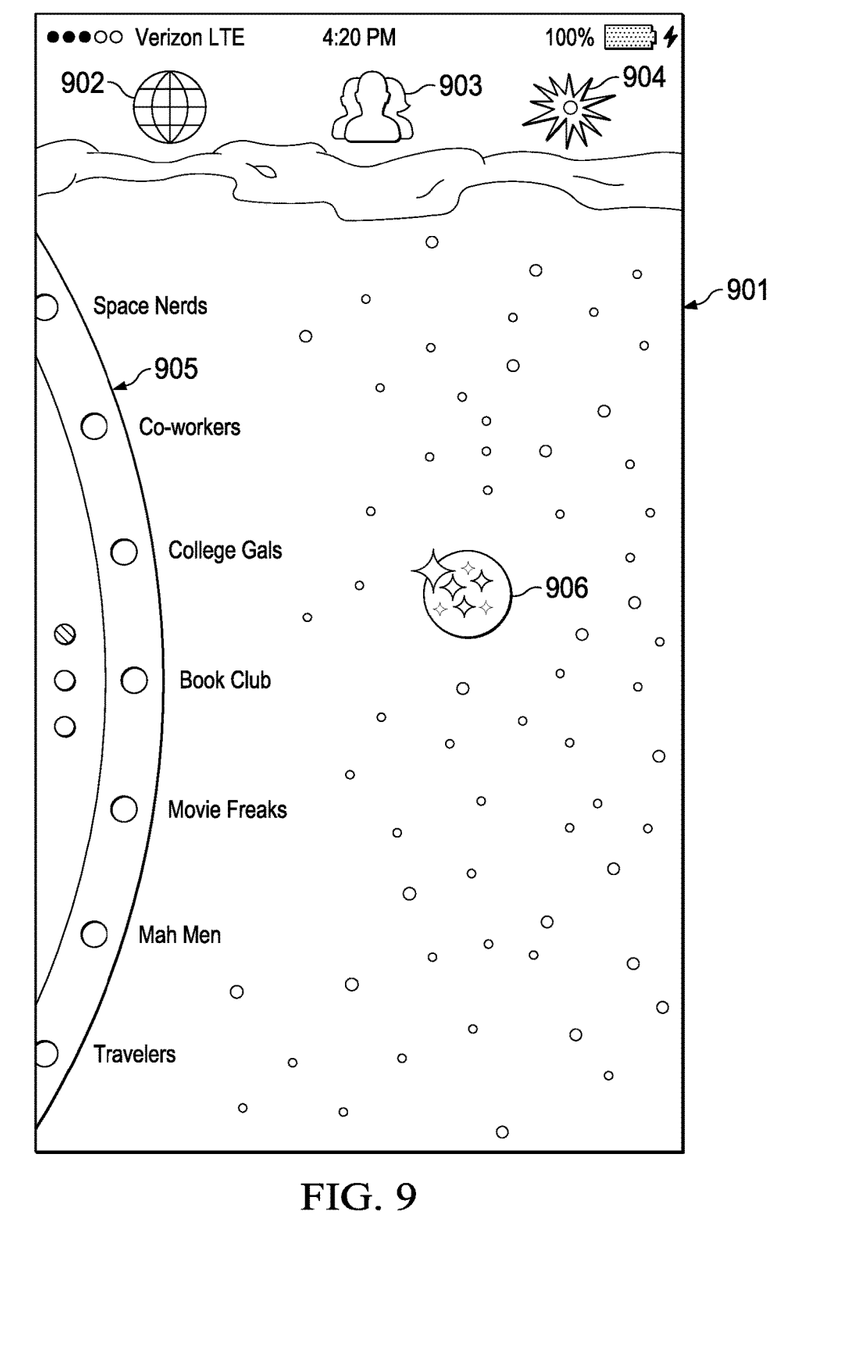
FIG. 9 is a screenshot of a user group and a user status of a preferred embodiment.

Referring to FIG. 9 in one embodiment, user group screen 901, news template button 902, user group button 903, profile button 904, and user group list 905. User group screen 906 further includes user status 906. User status 906 is a graphical representation of a set of user activity statistics. Any type of graphical representation may be employed. For example, user status 906 is a "star core" that becomes "hotter" in temperature based on the set of

TABLE 1

User Activity Statistics

| Activity | Number of "Degrees" Increase in User Status |
|---|---|
| "Like" an article | 25 |
| "Like" a comment | 25 |
| Post a video comment on an article | 25 |
| Post a video sub-comment on a comment | 25 |
| Receive a "like" on an article posted by the user | 25 |
| Receive a comment on an article posted by the user | 25 |
| Receive an article posted in a private user group | 25 |
| Receive an article posted in a public user group | 25 |
| Another user joins a public user group of the user | 25 |
| User accepts a request to join a public user group | 25 |
| User shares an article to other social media accounts of the user | 50 |
| Receive a request to join a public user group | 50 |
| Post an article with a video comment attached | 100 |
| Post an article authored by user | 100 |
| Create a public user group or a private user group | 100 |
| Provide system server access to other social media account of user | 200 |
| Invite user contacts or social media contacts to set-up a profile | 200 |

In this example of user status 906, the user accumulates "degrees" as user activity increases and is transformed into a variable "star core" graphical representation of the set of user activity statistics that changes according the set of status levels described in Table 2 below.

TABLE 2

User Activity Status

| Star Core Status | Number of Degrees |
| --- | --- |
| Protostar Purple | 19,000,000° F. to 19,999,999° F. |
| Red Dwarf | 20,000.000° F. to 39,999,999° F. |
| Orange | 40,000,000° F. to 59,999,999° F. |
| Yellow | 60,000,000° F. to 79,999,999° F. |
| White | 80,000,000° F. to 99,999,999° F. |
| Light Blue | 100,000,000° F. to 139,999,999° F. |
| Blue | 140,000,000° F. to 159,999,999° F. |
| Dark Blue | 160,000,000° F. to 179,999,999° F. |
| Red Super Giant (Supernova) | 180,000,000° F. to 199,999,999° F. |
| Neutron Star | 200,000,000° F. and above |

Figure 10:
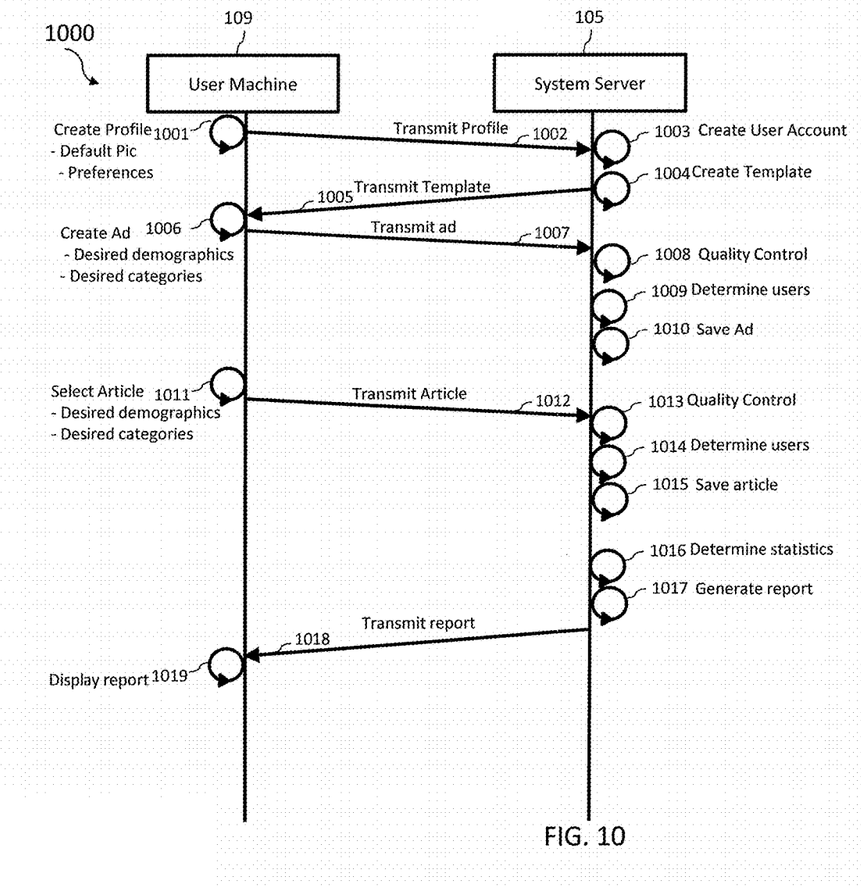
FIG. 10 is a flowchart of a method for generating advertising content of a preferred embodiment.

Referring to FIG. 10, method 1000 for generating advertising content will be described.

At step 1001, a user associated with user machine 109 creates a profile including demographic information related to the user and certain identifying information such as default pictures. In this embodiment, the user is a business, an advertiser, or a public figure. The profile further includes a set of preferences that includes a set of content interests with which the user profile will be associated. For example, the set of content interests includes sports, politics, science and technology, and entertainment. In a preferred embodiment, a default picture is used to represent the user to other users on system server 105. In a preferred embodiment, the default picture is a three (3) second silent profile video which is activated once upon a first view and will only start again if prompted.

At step 1002, the profile is transmitted to system server 105. At step 1003, system server 105 then creates the user account including the user information. At step 1004, system server 105 creates a template. In a preferred embodiment, the template provides an advertisement template in which advertisements are created and submitted in different categories by user machines and user groups. At step 1005, system server 105 transmits the template to user machine 109. At step 1006, user machine 109 creates an advertisement in any form of media, including text, graphics, audio, and/or video. In a preferred embodiment, the advertisement includes a set of desired categories to which the advertisement will be posted. For example, a sports equipment store selects "sports" as a desired category. Users searching for content in the sports category will then be presented with the advertisement for the sports equipment store. In another embodiment, the advertisement includes a set of desired user demographics, including location. In another embodiment, the advertisement includes the set of desired categories and the set of desired demographics. At step 1007, the advertisement is transmitted to system server 105.

At step 1008, system server 105 conducts a quality control survey of the advertisement provided by user machine 109. In this step, the advertisement is scanned for harmful content such as viruses and malware, typographical errors, audio quality, and/or video quality. In one embodiment, the advertisement is scanned for objectionable material such as adult content and/or profanity. Any type of content filtering may be employed.

At step 1009, system server 105 determines a set of users to receive the advertisement. In a preferred embodiment, the set of desired categories is compared to the set of preferences of each user to determine a match. In another embodiment, the set of desired demographics is compared to the set of user demographics to determine a match. In another embodiment, the set of desired categories is compared to the set of preferences and the set of desired demographics is compared to the set of user demographics to determine a match. In this way, the advertisement is presented to a set of matched users and/or in a set of matched categories.

At step 1010, the advertisement is saved into the database.

At step 1011, user machine 109 selects an article from the database. For example, the content provider writes an article about a new menu item of a restaurant user. The restaurant user selects the article from the database for distribution. In a preferred embodiment, the advertisement includes a set of desired categories to which the advertisement will be posted. In another embodiment, the advertisement includes a set of desired user demographics, including location. In another embodiment, the advertisement includes the set of desired categories and the set of desired demographics. At step 1012, the article is transmitted to system server 105. At step 1013, system server 105 conducts a quality control survey of the article provided by user machine 109, as previously described. At step 1014, system server 105 determines a set of users to receive the article, as previously described in step 1009. At step 1015, the article is saved in the database.

At step 1016, system server 105 determines a set of statistics for each of the advertisement and the article. In a preferred embodiment, the set of statistics includes, but is not limited to, a number views, a number of clicks, a number impressions, any comments, and a set of user demographics for each of the forgoing. At step 1017, a report is generated from the set of statistics. At step 1018, the report is transmitted to user machine 109. At step 1019, the report is displayed on user machine 109.

It will be appreciated by those skilled in the art that the described embodiments disclose significantly more than an abstract idea including technical advancements in the fields of computers, computer networks, and data processing and a transformation of data which is directly related to real world objects and situations. Specifically, the disclosed embodiments define, assemble, and condense content in order to distribute the content. As result, the content is reduced in size resulting in reduced memory and bandwidth consumed by the content.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A distribution system comprising:
   a network;
   a set of articles distributed through the network;
   a set of user machines connected to the network;
   a system server connected to the network and programmed to:
      receive a set of users;
      determine a user group from the set of users;
      distribute the set of articles to the set of user machines based on the user group;
      receive a set of video commentary to the set of articles;
      generate a video thread from the set of video commentary;
      stream the video thread to the set of user machines based on the user group;
   wherein the set of user machines comprises a first user machine, a second user machine, and a third user machine each connected to the network, wherein the set of articles comprises news content that is selected from one of the group of news content generated by the system server and news content received from a content provider, and the system server is programed to:
  when the news content is generated by the system server, the system server is programmed to:
    send a news template to a fourth user machine that is selected from the group consisting of the first user machine, the second user machine, and the third user machine;
    receive a news story created with the news template from the fourth user machine;
    generate the news content from the news story;
  when the news content is received from the content provider, the system server is programmed to:
    send a request to the content provider for the news content;
    receive the news content from the content provider;
  send the news content and ad content to a fifth user machine selected from the group consisting of the first user machine, the second user machine, and the third user machine;
  receive a first video commentary and a user group identification from the fifth user machine;
  when a sixth user machine selected from the group consisting of the first user machine, the second user machine, and the third user machine is different from the fifth user machine, the system server is programmed to:
    receive a join request that is from the sixth user machine and that is in response to an invitation sent from the fifth user machine to the sixth user machine;
    add a user of the sixth user machine to a group identified by the user group identification;
    receive a content request from the sixth user machine;
    send one or more of the group consisting of the news content and the first video commentary to the sixth user machine;
    receive a second video commentary from the sixth user machine;
    receive a sub-distribution list from the sixth user machine;
    verify the sub-distribution list; and,
    send one or more of the group consisting of the news content, the first video commentary, and the second video commentary to a seventh user machine that is part of the sub-distribution list.

2. The system of claim 1, wherein the fourth user machine is programmed to:
  display a user group screen that includes a news template button, a user group button, a profile button, a user group list, and a user status;
  display the user status as a star core selected from the group consisting of protostar purple, red dwarf, orange, yellow, white, light blue, blue, dark blue, red super giant (supernova), and neutron star;
  update a display of the user status based on user activity statistics;
  when the news template button on the user group screen is selected, the fourth user machine is programmed to:
    receive the news template from the server;
    display a news template screen that includes a plurality of categories from the news template;
    receive a selection of a category from the plurality of categories;
    display a plurality of subcategories related to the selected category on the news template screen;
    receive a selection of a subcategory from the plurality of categories;
    display a create button that, when selected, provides an article template;
    display a record button that, when selected, enables a camera application on the fourth user machine to record a video that is the first video commentary and that is associated with the news content;
    display a notification button that, when selected, refreshes content in the news template on the news template screen and organizes the content in reverse chronological order;
  when the create button on the news template screen is selected, the fourth user machine is programmed to:
    display an article template screen that includes: an image related to the news content, a category menu, a title input, a description input, a share menu, and a next button;
    associate a category with the news content using the category menu;
    associate a title with the news content using the title input;
    associate a description with the news content using the description input, wherein the description includes a link to one of the group consisting of a website and a social media account of the a user of the fourth device;
    identify one or more third party social networks with which to share the news content using the share menu;
  when the next button on the article template screen is selected, the fourth user machine is programmed to:
    display a distribution menu screen that includes: a search tool, a set of user groups that each have a select button, a set of users that each have a select button, and a post button;
    form a selection set comprising one or more user groups and users using the select buttons of the user groups and the select buttons of the users; and,
    distribute the news content upon selection of the post button to the selection set.

3. The system of claim 2, wherein the fifth user machine is programmed to:
  receive the news content from the server;
  display an article screen including a video associated with the news content, the title of the news content, an identification of the user of the fourth user machine as the author of the news content, the description, a comment indicator, a like indicator, a record button;
  when the comment indicator on the article screen is selected, the fifth user machine is programmed to:
    display a comments section screen that includes a set of comments;
    display on a comment of the set of comments a user that is associated with the comment, a post time of the comment, a video of the comment, and a reply button of the comment;
    post a sub-comment to a comment upon selection of the reply button of the comment; and,
    display a sub-comment of a comment that includes a user that is associated with the sub-comment, a post time of the sub-comment, a video of the sub-comment, and a reply button of the sub-comment.

4. The system of claim 1, further comprising the content provider connected to the network.

5. The system of claim 4, wherein the system server is further programmed to receive a set of news content from the content provider.

6. The system of claim 5, wherein the system server is further programmed to generate the set of articles from the set of news content.

7. The system of claim 5, wherein the system server is further programmed to:
- receive a set of user content from the set of user machines; and,
- generate the set of articles from the set of news content and the set of user content.

8. The system of claim 1, wherein the system server is further programmed to associate the set of video commentary with the set of articles to generate a set of threads.

9. The system of claim 1, wherein the system server is further programmed to generate a set of advertisements for the set of articles.

10. The system of claim 9, wherein the system server is further programmed to:
- receive a set of desired demographics; and,
- determine a set of recipient users for the set of advertisements from the set of demographics.

11. The system of claim 9, wherein the system server is further programmed to:
- receive a set of desired categories; and,
- determine a set of recipient users for the set of advertisements from the set of desired categories.

12. The system of claim 1, wherein the system server is further programmed to:
- retrieve a set of codes related to the set of video commentary;
- link the set of codes into a set of linked codes; and,
- combine each video commentary of the set of video commentary into a single video based on the set of linked codes.

* * * * *